United States Patent
Okada

(10) Patent No.: US 11,167,360 B2
(45) Date of Patent: Nov. 9, 2021

(54) METHOD FOR MANUFACTURING PROCESSED ARTICLE, TOOL PATH CALCULATION METHOD, PROCESSED ARTICLE, AND IMPELLER

(71) Applicant: DAIKIN INDUSTRIES, LTD., Osaka (JP)

(72) Inventor: Tadashi Okada, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/975,592

(22) PCT Filed: Feb. 27, 2019

(86) PCT No.: PCT/JP2019/007703
§ 371 (c)(1),
(2) Date: Aug. 25, 2020

(87) PCT Pub. No.: WO2019/168070
PCT Pub. Date: Sep. 6, 2019

(65) Prior Publication Data
US 2020/0391309 A1    Dec. 17, 2020

(30) Foreign Application Priority Data
Feb. 28, 2018 (JP) .............................. JP2018-035586

(51) Int. Cl.
*B23C 3/18* (2006.01)
*B23C 5/10* (2006.01)

(52) U.S. Cl.
CPC ................. *B23C 3/18* (2013.01); *B23C 5/10* (2013.01); *B23C 2210/084* (2013.01);
(Continued)

(58) Field of Classification Search
CPC ... B23C 3/18; B23C 2220/04; B23C 2220/36; B23C 2220/366; B23C 2215/045;
(Continued)

(56) References Cited

U.S. PATENT DOCUMENTS

| 2,407,469 A | * | 9/1946 | Birmann | ................... B23C 3/18 |
| | | | | 416/223 R |
| 2,480,807 A | * | 8/1949 | De Vlieg | .................. B23C 3/18 |
| | | | | 409/84 |

(Continued)

FOREIGN PATENT DOCUMENTS

| CA | 2396216 A1 * | 2/2003 | ............. F01D 5/147 |
| CA | 2 883 147 A1 | 5/2014 | |

(Continued)

OTHER PUBLICATIONS

JP-09011020-A Machine Translation, pp. 5-9 (Year: 2020).*

(Continued)

*Primary Examiner* — Nicole N Ramos
(74) *Attorney, Agent, or Firm* — Global IP Counselors, LLP

(57) ABSTRACT

A processed article is manufactured with a tool including a cutting blade. The cutting blade is arranged to be in contact with two machined segment surfaces so that two contact points are defined between the two machined segment surfaces and the cutting blade in a corner. A machining pitch is set in a pick feed direction of the tool at the corner to a first machining pitch for when a part of the cutting blade corresponding to a projected shape of a side surface of the cutting blade having a first curvature radius is a cutting point. A cut is performed along a feed direction in the two adjacent machined segment surfaces successively at the corner so that the tool proceeds toward the corner in one of the machined (Continued)

segment surfaces and away from the corner in the other one of the machined segment surfaces.

20 Claims, 8 Drawing Sheets

(52) U.S. Cl.
CPC ...... *B23C 2215/44* (2013.01); *B23C 2220/04* (2013.01); *B23C 2220/36* (2013.01)

(58) Field of Classification Search
CPC ............ B23C 2215/04; B23C 2215/44; B23C 2215/52; B23C 2215/56
See application file for complete search history.

(56) References Cited

U.S. PATENT DOCUMENTS

| | | | |
|---|---|---|---|
| 2003/0039547 A1 | 2/2003 | Bourgy et al. | |
| 2008/0011142 A1* | 1/2008 | Cheung | B26D 3/10 83/776 |
| 2010/0111632 A1* | 5/2010 | Tingley, III | B23D 13/00 409/293 |
| 2013/0019477 A1* | 1/2013 | Blais | G05B 19/4207 29/889.7 |
| 2013/0051939 A1* | 2/2013 | Wu | B23C 3/18 407/53 |
| 2015/0354359 A1* | 12/2015 | Matsuda | F02B 39/00 416/204 A |
| 2016/0010657 A1 | 1/2016 | Kimura et al. | |

FOREIGN PATENT DOCUMENTS

| | | | | |
|---|---|---|---|---|
| CN | 1413790 A | | 4/2003 | |
| DE | 19515555 A1 | * | 11/1995 | ............. B24B 19/14 |
| GB | 586100 A | * | 3/1947 | ............... B23C 3/18 |
| GB | 707256 A | * | 4/1954 | ............... B23C 3/18 |
| JP | 63123603 A | * | 5/1988 | |
| JP | 6-259123 A | | 9/1994 | |
| JP | 8-252713 A | | 10/1996 | |
| JP | 8-263122 A | | 10/1996 | |
| JP | 09011020 A | * | 1/1997 | ............... B23C 3/34 |
| JP | 2003-120203 A | | 4/2003 | |
| JP | 2006-1008 A | | 1/2006 | |
| JP | 2014-67200 A | | 4/2014 | |
| JP | 2012-149583 A | | 8/2014 | |
| JP | 2015-74078 A | | 4/2015 | |
| JP | 2018-15806 A | | 2/2018 | |
| WO | 2013/054832 A1 | | 4/2013 | |
| WO | 2014/067024 A1 | | 5/2014 | |
| WO | 2015/002066 A1 | | 1/2015 | |
| WO | 2017149865 A1 | | 9/2017 | |

OTHER PUBLICATIONS

International Search Report of corresponding PCT Application No. PCT/JP2019/007703 dated May 21, 2019.
International Preliminary Report of corresponding PCT Application No. PCT/JP2019/007703 dated Sep. 1, 2020.

* cited by examiner

METHOD FOR MANUFACTURING PROCESSED ARTICLE, TOOL PATH CALCULATION METHOD, PROCESSED ARTICLE, AND IMPELLER

CROSS-REFERENCE TO RELATED APPLICATIONS

This U.S. National stage application claims priority under 35 U.S.C. § 119(a) to Japanese Patent Application No. 2018-035586, filed in Japan on Feb. 28, 2018, the entire contents of which are hereby incorporated herein by reference.

BACKGROUND

Field of the Invention

The present disclosure relates to a method for manufacturing a processed article, a method for calculating a tool path, a processed article, and an impeller.

Background Information

In a known method for manufacturing a processed article, end mill machining is performed on a machined surface using a straight portion of the tool or a portion where a projected shape of the tool has a large radius of curvature as a cutting blade to increase the width that is cut at the same time and reduce the machining time of the machined surface. International Publication No. 2015/2066 and Japanese Patent Laid-Open No. 8-252713 are examples of prior art documents disclosing such a manufacturing method of a processed article. International Publication No. 2015/2066 relates to a method for manufacturing an open-type turbo compressor impeller. Japanese Patent Laid-Open No. 8-252713 relates to a machining method using a tool having a cutting blade, the cutting blade having the rotation path forms a quadratic curve. The method is for machining an open free surface using a multi-axis control processing machine.

SUMMARY

These prior art documents do not include any disclosure related to the machining of a corner between adjacent machined surfaces of, for example, a compressor impeller.

One object of the present disclosure is to provide a method for manufacturing a processed article, a method for calculating a tool path, a processed article, and an impeller that reduce the machining time of adjacent machined surfaces.

A method for manufacturing a processed article in accordance with a first aspect is performed with a tool, the tool including a cutting blade, the cutting blade having a projected shape of a side surface formed from arcs having different curvature radii to machine a machined surface that includes a least one corner connecting two adjacent machined segment surfaces. In a state in which the tool is in contact with the two machined segment surfaces at two contact points in the corner and a curvature radius at the one of the contact points having a smaller cross-sectional radius is a first curvature radius, the method includes setting a machining pitch in a pick feed direction of the tool at the corner to a machining pitch for when a contact point corresponding to the first curvature radius is a cutting point.

This configuration allows for successive machining of the machined segment surfaces, which are adjacent to a corner, while appropriately using the portion of the tool having a large curvature radius. Thus, the machining time is reduced while maintaining the surface roughness at less than or equal to a set value. In the present specification, the surface roughness is in accordance with Japanese Industrial Standards JIS B0601:2001.

With the method for manufacturing a processed article in accordance with a second aspect, the tool is formed so that a cross-sectional radius of a maximal diameter portion of the cutting blade as viewed from a tip in a tool axis is less than or equal to a machined radius that is formed when machining the corner.

This configuration allows for successive machining of the machined segment surfaces adjacent to a corner.

With the method for manufacturing a processed article in accordance with a third aspect, the processed article includes the machined surface having a three-dimensional curve forming a closed space. The machined segment surfaces form part of the machined surface.

This configuration allows for successive machining of the machined segment surfaces adjacent to a corner even for the processed article that includes the three-dimensionally curved machined surface forming a closed space.

With the method for manufacturing a processed article in accordance with a fourth aspect, when a portion of the tool where the curvature radius is small is a cutting point, the curvature radius of the tool is denoted by R1, and the machining pitch in the pick feed direction of the tool is denoted by P1. Further, when a portion of the tool where the curvature radius is large is a cutting point, the curvature radius of the tool is denoted by R2, and the machining pitch in the pick feed direction of the tool is denoted by P2. In this case, the machining pitch in the pick feed direction is set to satisfy an inequality of $(P2/\sqrt{R2}) \geq (P1/\sqrt{R1})$.

With this configuration, when measuring the surface roughness of the three-dimensionally curved machined surface of a work that is machined, the pitch of cusps formed in the pick feed direction can be increased to a range in which the cusp pitch can be considered to be an undulation.

With the method for manufacturing a processed article in accordance with a fifth aspect, the machined surface includes a plurality of corners connecting the two adjacent machined segment surfaces. When the machining pitch at the corner at one end of the machined segment surface differs from the machining pitch at the corner of another end, the machining pitch in the pick feed direction on the machined segment surfaces is set to change in proportion to a distance between the corners on the machined segment surfaces.

This configuration appropriately sets the machining pitch in the pick feed direction when feeding the tool over the corners to perform successive machining.

With the method for manufacturing a processed article in accordance with a sixth aspect, the machined surface is machined while performing 5-axis control on an orientation and a position of the tool relative to the machined surface.

For example, a complex three-dimensionally curved surface can be machined by a 5-axis processing machine of a type that tilts and rotates a table on which a work is mounted.

With the method for manufacturing a processed article in accordance with a seventh aspect, the tool is attached to an articulated robot to control the orientation and the position of the tool relative to the machined surface.

This configuration allows to machine a complex three-dimensionally curved surface without using a 5-axis processing machine.

A method for calculating a tool path in accordance with an eighth aspect is used in the method for manufacturing a processed article. The method includes calculating an orientation of the tool in correspondence with the machined surface to avoid interference with a work, calculating the curvature radius of the tool to maintain the calculated tool orientation at a cutting point, and calculating the machining pitch in the pick feed direction based on the curvature radius to satisfy a predetermined surface roughness condition.

This configuration reduces the machining time of the processed article while maintaining the set surface roughness reference value.

A processed article in accordance with a ninth aspect is manufactured by controlling the tool in accordance with the tool path calculation method.

This configuration reduces the machining time of the processed article and decreases the manufacturing costs of the processed article.

An impeller in accordance with a tenth aspect is manufactured by the method for manufacturing a processed article. In the impeller, tool machining marks are left on the machined surface. The tool machining marks are formed in a manner so that concave grooves are formed successively in the pick feed direction of the tool and so that the machining pitch of adjacent ones of the concave grooves increases at portions where a curvature radius of the concave grooves increases.

In this manner, the manufacturing method can be applied to reduce the machining time while maintaining the set surface roughness reference value.

The impeller in accordance with an eleventh aspect is a closed impeller for a turbo compressor.

This configuration reduces the machining time of the turbo compressor closed impeller while maintaining the set surface roughness reference value.

BRIEF DESCRIPTION OF THE DRAWINGS

FIGS. 13A and 13B are diagrams illustrating the method for setting the machining pitch in the pick feed direction at a corner, in which FIG. 13A is a diagram showing a state in which the elliptic tool is pressed against the corner, and FIG. 13B is a diagram illustrating a cross-sectional radius and a curvature radius at a contact point of the tool.

FIGS. 14A and 14B are diagrams illustrating a desirable size of the elliptic tool, in which FIG. 14A is a side view of the elliptic tool, FIG. 14B is a diagram of the tool as viewed in an arrowed direction Q.

DETAILED DESCRIPTION OF EMBODIMENT(S)

A method for machining a closed impeller for a turbo compressor using an elliptic tool in accordance with one embodiment will now be described.

Here, the term "elliptic tool" means a tool of which the projected shape of a side surface is formed by arcs having different radii of curvatures. Further, the phrase "tool of which the projected shape of a side surface is formed by arcs having different radii of curvatures" refers to a tool including a projected shape at a side parallel to a tool axis that is formed from arcs having different radii of curvatures, for example, an ellipse or a barrel-shape. The tool includes an end mill, a grinding stone, a brush, or the like.

Figure 1:
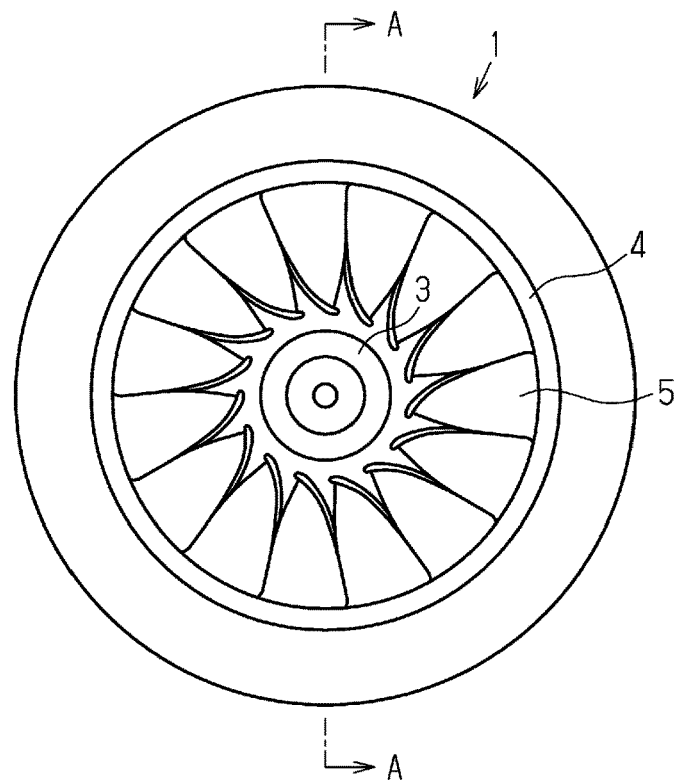
FIG. 1 is a front view showing a hub side of a turbo compressor closed impeller in accordance with one embodiment taken in an axial direction.
Figure 2:
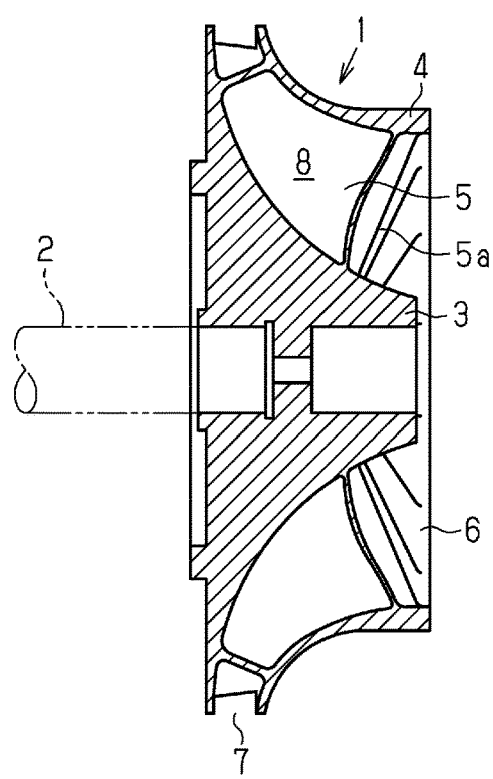
FIG. 2 is a cross-sectional view taken along line A-A in FIG. 1.

As shown in FIGS. 1 and 2, a turbo compressor closed impeller 1 in accordance with the present embodiment includes a hub 3, a shroud 4, and blades 5. The hub 3 is fixed to a rotation shaft 2. The shroud 4 opposes the hub 3. The blades 5 each have a three-dimensional shape and extend between the hub 3 and the shroud 4.

The turbo compressor closed impeller 1 includes an inlet 6 and an outlet 7 at opposite sides of the hub 3. The inlet 6 opens in an axial direction. The outlet 7 opens radially outward in a circumferential surface of the hub 3.

The hub 3 is fixed to one end of the rotation shaft 2 and rotated. When the surface of the hub 3 is located at the side of the inlet 6 is an upper surface and the opposite surface is a bottom surface, the hub 3 includes an outer circumferential surface that extends radially outward from the upper surface toward the bottom surface.

The shroud 4 is shaped to extend radially outward opposing the upper surface of the hub 3. Further, the shroud 4 is configured so that the distance between the shroud 4 and the upper surface of the hub 3 decreases from the inlet 6 toward the outlet 7.

The blades 5 extend between the outer circumferential surface of the hub 3 and an inner circumferential surface of the shroud 4, which is located radially outward from the outer circumferential surface of the hub 3. The blades 5 are formed integrally with the hub 3 and the shroud 4. The shape of each blade 5 changes three-dimensionally from the outer circumferential surface of the hub 3 toward the inner circumferential surface of the shroud 4. Further, each blade 5 is connected to the outer circumferential surface of the hub 3 and the inner circumferential surface of the shroud 4 and curved in a complex manner so as to be inclined relative to the outer circumferential surface of the hub 3 and the inner circumferential surface of the shroud 4. Each blade 5 includes a leading edge 5a of which the side of the shroud 4 is closer to the inlet than the side of the hub 3.

A method for manufacturing a processed article by performing end milling, in which the processed article is the turbo compressor closed impeller, will now be described.

In the present specification, the term "work 101" refers to the turbo compressor closed impeller 1 serving as a machining subject prior to surface finishing.

Figure 3:
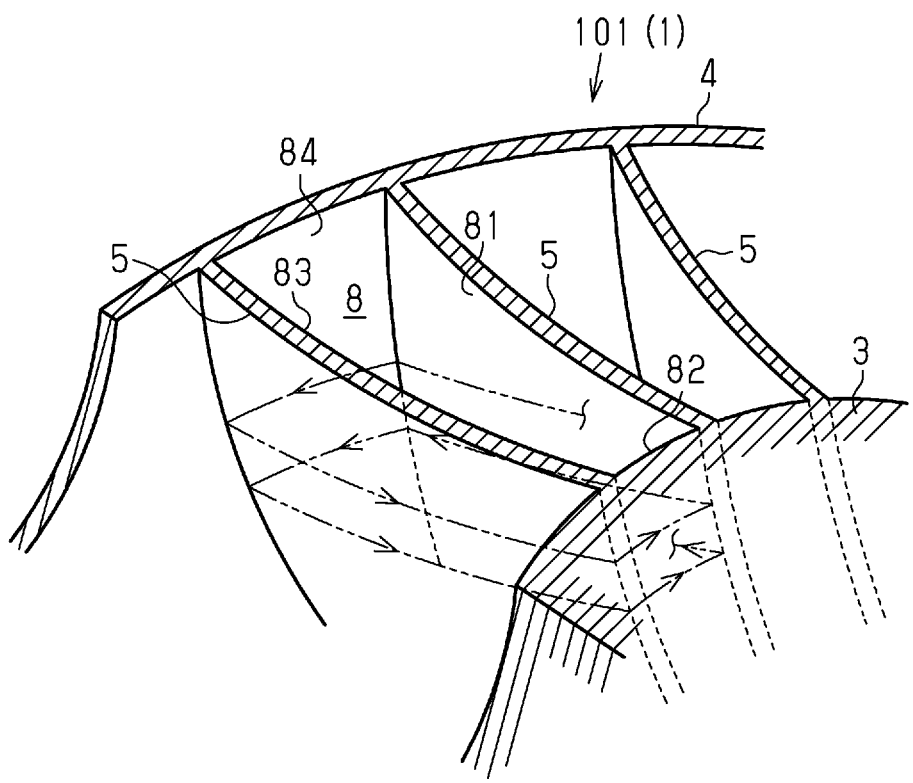
FIG. 3 is a diagram showing a cutting path of a tool when end milling the turbo compressor closed impeller.

As shown in FIG. 3, the work 101 includes the above-described hub 3, shroud 4, and blades 5 so that compression passages 8 are formed between the blades 5 to compress a fluid. Each compression passage 8 is a flow passage surrounded by wall surfaces 81, 82, 83, and 84. The wall surfaces 81 and 83 are the blade surfaces of the blades 5, the wall surface 82 is the outer circumferential surface of the hub 3, and the wall surface 84 is the inner circumferential surface of the shroud 4.

Each compression passage 8 has a dimension between the hub 3 and the shroud 4 that decreases from the side of the inlet 6 toward the side of the outlet 7. Accordingly, the compression passage 8 has a cross-sectional area that decreases from the side of the inlet 6 toward the side of the outlet 7.

The wall surfaces 81, 82, 83, and 84 forming the compression passage 8 are curved so that the outer circumferential surface of the hub 3 and the inner circumferential surface of the shroud 4 widen in the radial direction from the side of the inlet 6 toward the side of the outlet 7. Also, each blade 5 has a complex three-dimensionally curved surface, and thus each compression passage 8 has a complex three-dimensional shape. With the turbo compressor closed impeller 1 including the compression passages 8, centrifugal force resulting from rotation compresses fluid, namely a refrigerant when the turbocharger is for a refrigerating device, drawn in from the inlet 6 and directed toward the outlet 7.

In the method for manufacturing a processed article in accordance with the present embodiment, the compression passages 8 of the work 101 undergo end milling for surface finishing. The work 101 that will be end-milled (that is, turbo compressor closed impeller 1 prior to surface finishing) is formed through precision casting or by machining a block.

Figure 4:
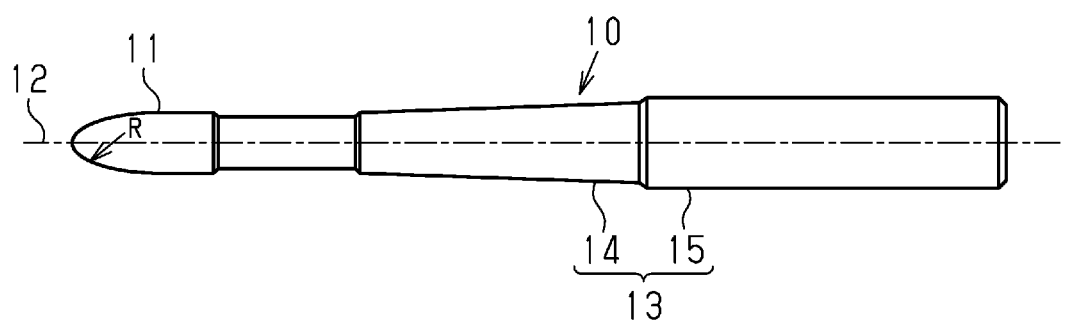
FIG. 4 is a diagram showing a projected shape of a side surface of an elliptic tool used for end milling of the turbo compressor closed impeller.

As shown in FIG. 4, an elliptic tool 10 is used in the present method for manufacturing a processed article as a tool for performing end milling. A cutting blade 11 at a distal end of the elliptic tool 10 has a projected shape at a side parallel to a tool axis 12 that is substantially one-half of an ellipse formed by arcs having multiple curvature radii R. The elliptic tool 10 has a shank 13 including a tapered section 14 and a straight section 15. The straight section 15 is larger in diameter than the cutting blade 11.

Figure 5:
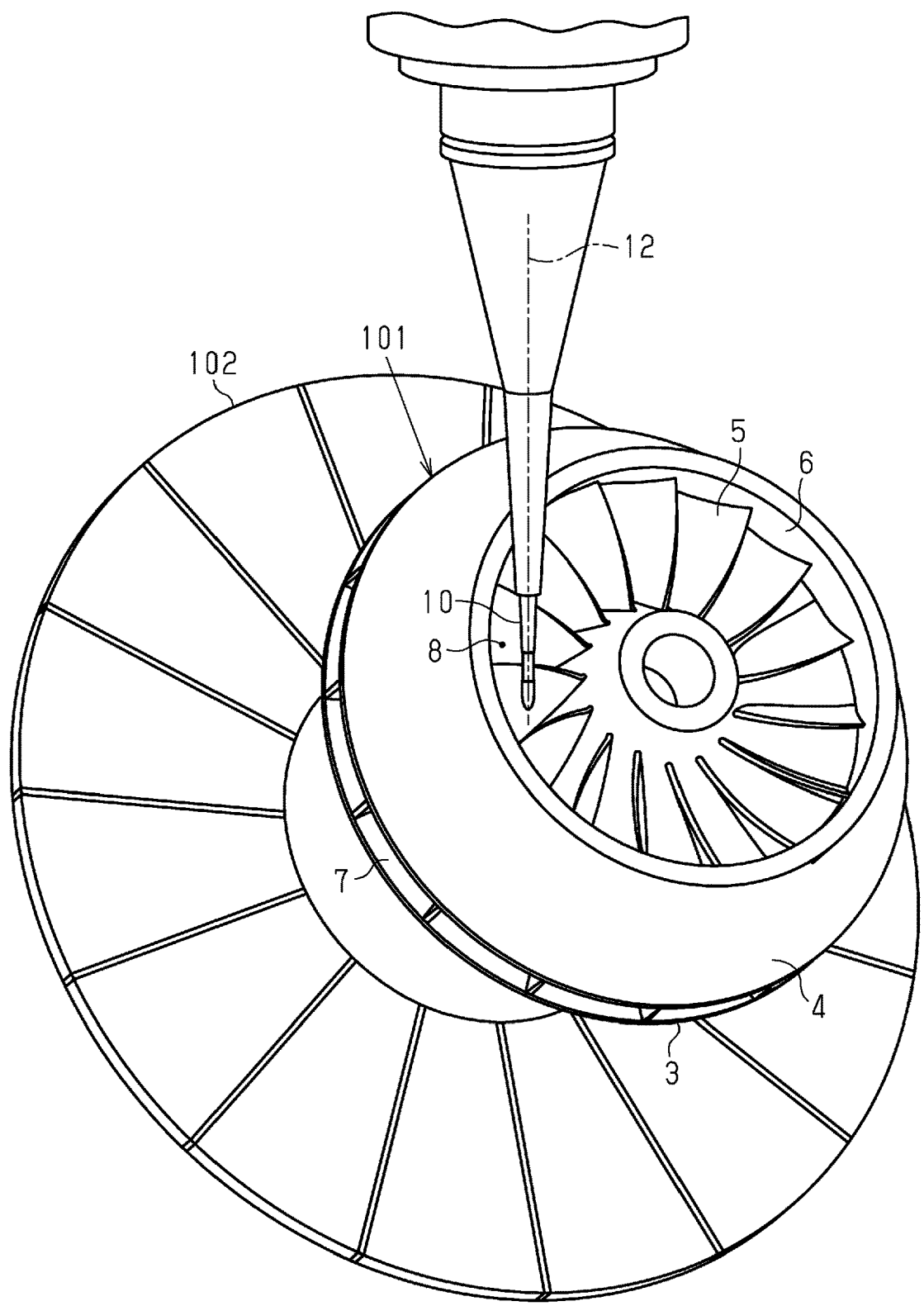
FIG. 5 is a perspective view showing a positional relationship of the elliptic tool and the turbo compressor closed impeller when end milling the impeller with the tool.

As shown in FIG. 5, the elliptic tool 10 is inserted through the inlet 6 or the outlet 7 of the work 101 into a compression passage 8, and a side surface of the cutting blade 11 is used to efficiently surface-finish the wall surfaces 81, 82, 83, and 84 of the compression passage 8. In FIG. 5, the work 101 is inclined in a state coupled to a table 102 of a 5-axis control machining center, and the elliptic tool 10 is attached to the 5-axis control machining center in a manner so that the tool axis 12 coincides with a vertical direction. When machining the proximity of the outlet 7 of the compression passage 8, the elliptic tool 10 is inserted from the outlet 7 of the work 101. However, in most cases, the elliptic tool 10 is inserted from the inlet 6 for machining.

Figure 6:
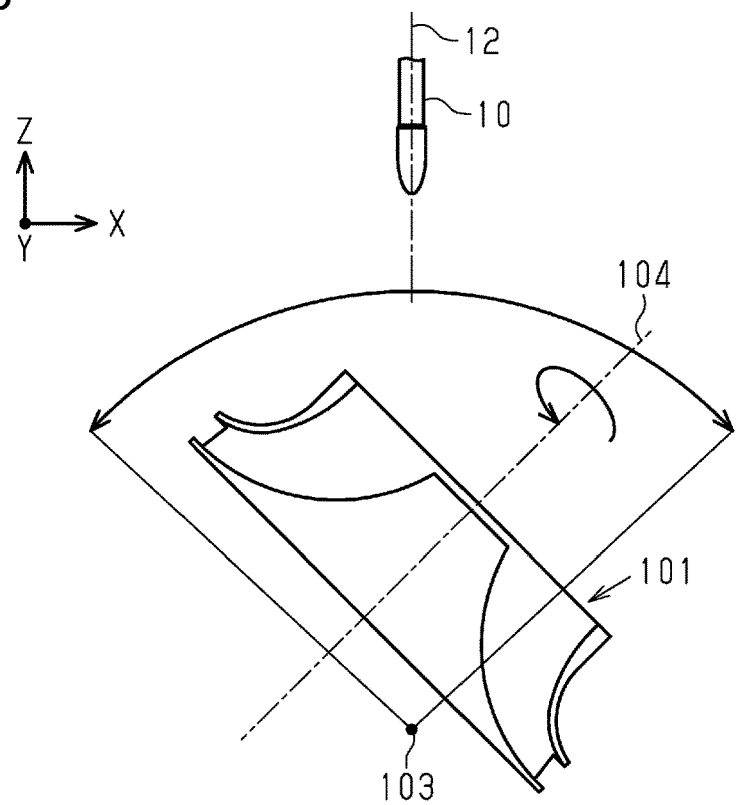
FIG. 6 is a diagram illustrating one example of 5-axis end milling of the turbo compressor closed impeller.

FIG. 6 is a diagram illustrating machining performed by the 5-axis control machining center in which two axes are at the side of the work 101.

The wall surfaces of the compression passage 8 have complex shapes. Thus, as shown in FIG. 6, the work 101 is machined by the 5-axis control machining center that has two rotation axes at the side of the table 102 on which the work 101 is mounted in addition to the three orthogonal axes (X-axis, Y-axis, Z-axis) along which the elliptic tool 10 is moved. The two axes at the side of the work 101 are a pivot axis 103 and a rotation axis 104. The pivot axis 103 is arranged for pivoting the work 101 in the X-direction about an axis parallel to Y-axis. The rotation axis 104 is arranged for rotating the work 101 about the center axis of the work 101.

As shown in FIG. 3, the wall surfaces 81, 84, 83, and 82 of the compression passage 8 are machined in order by spirally turning the elliptic tool 10 in directions indicated by the arrows along a cutting path taking into consideration a rotation direction of the elliptic tool 10. In the present specification, each compression passage 8 corresponds to a closed space. The inlet 6 and the outlet 7 each correspond to an opening of the closed space. The wall surfaces 81, 82, 83, and 84 correspond to machined segment surfaces 105a, 105b, etc. (refer to FIG. 12) that form a machined surface 105 (refer to FIG. 7).

In the present method for manufacturing a processed article, a path and an orientation of the elliptic tool 10 are calculated to improve machining efficiency. Specifically, a tool path of the elliptic tool 10 is calculated to use the portion where the elliptic tool 10 has a maximal curvature radius R in the projected shape at a side parallel to the tool axis 12.

Figure 7:
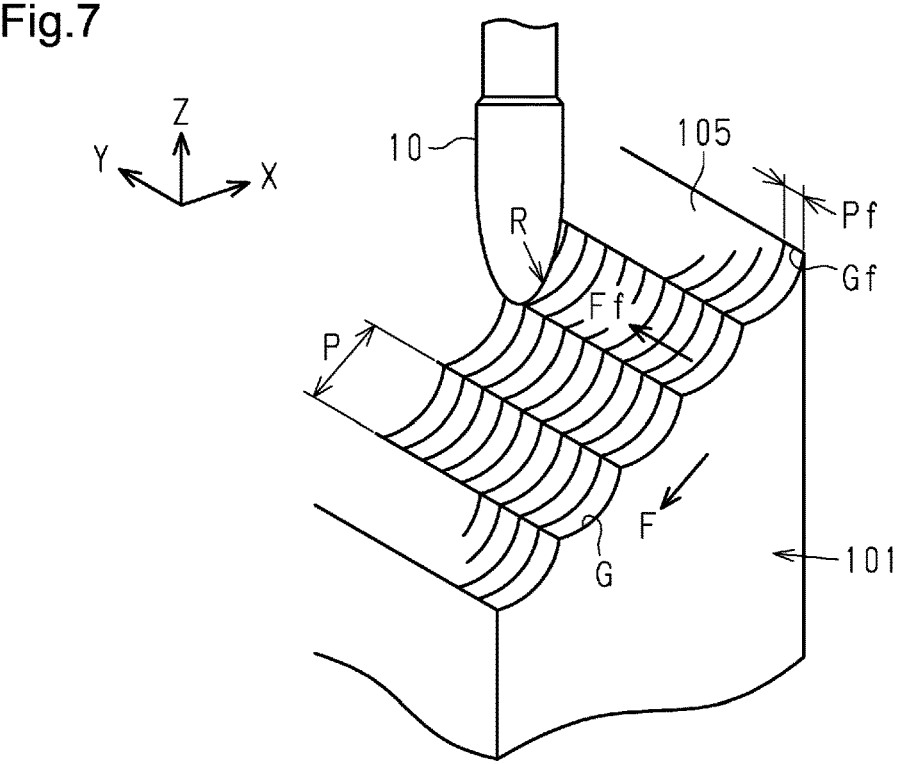
FIG. 7 is a diagram showing tool machining marks on the turbo compressor closed impeller.

As the partially enlarged diagram in FIG. 7 shows, typically, end milling using the elliptic tool 10 forms concave grooves Gf in the machined surface 105 at a feed pitch Pf in a feed direction of the tool, or a feed direction Ff. Further, in end milling, the elliptic tool 10 is fed at machining pitch P in a direction perpendicular to the feed direction Ff, or a pick feed direction F. In this manner, the concave grooves G are formed at the machining pitch P in the pick feed direction F.

Figure 8:
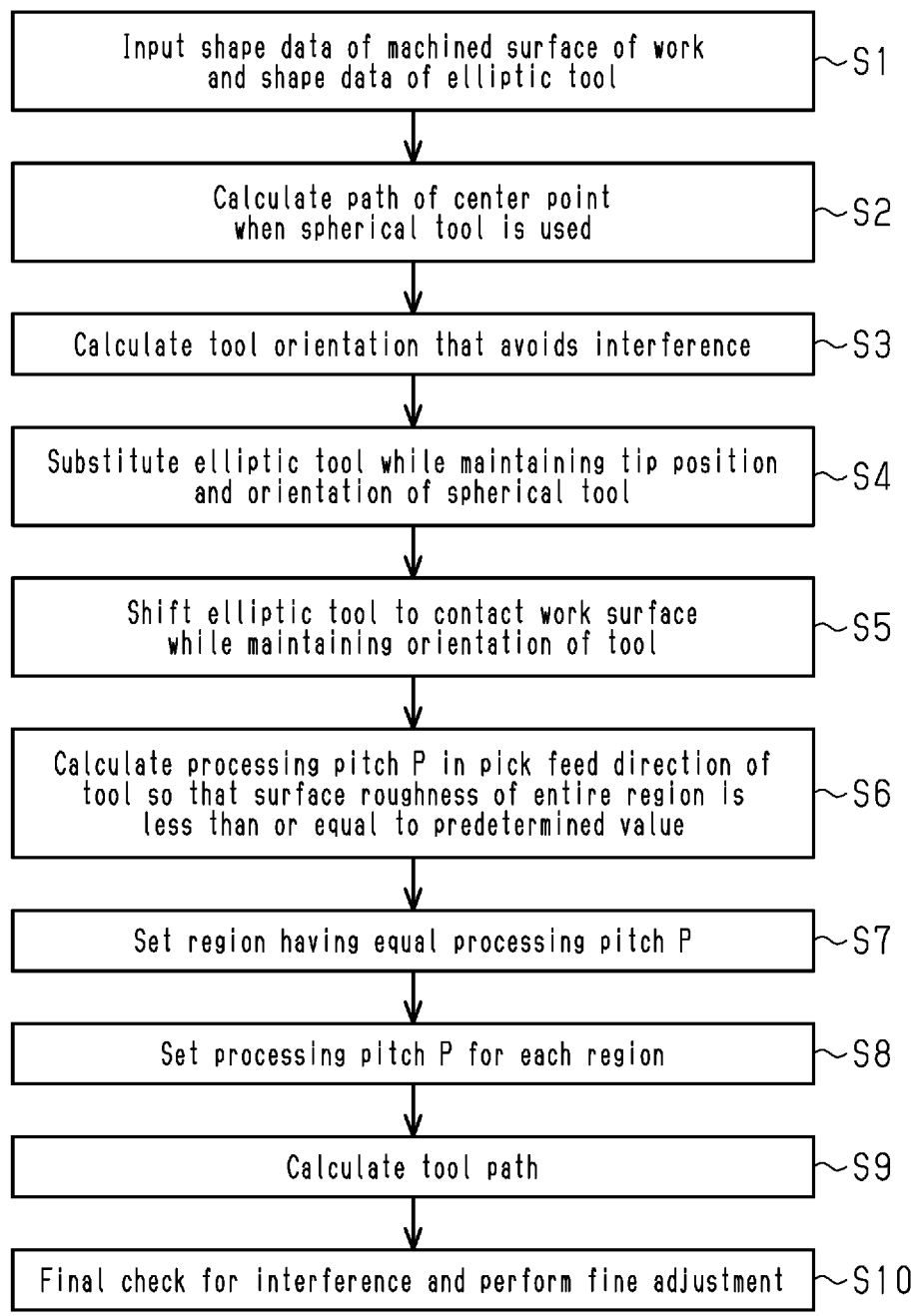
FIG. 8 is a flowchart illustrating a procedure of a method for calculating a tool path in accordance with the present embodiment.

The tool path calculation for the elliptic tool 10 is performed by the procedure illustrated in FIG. 8.

Figure 9:
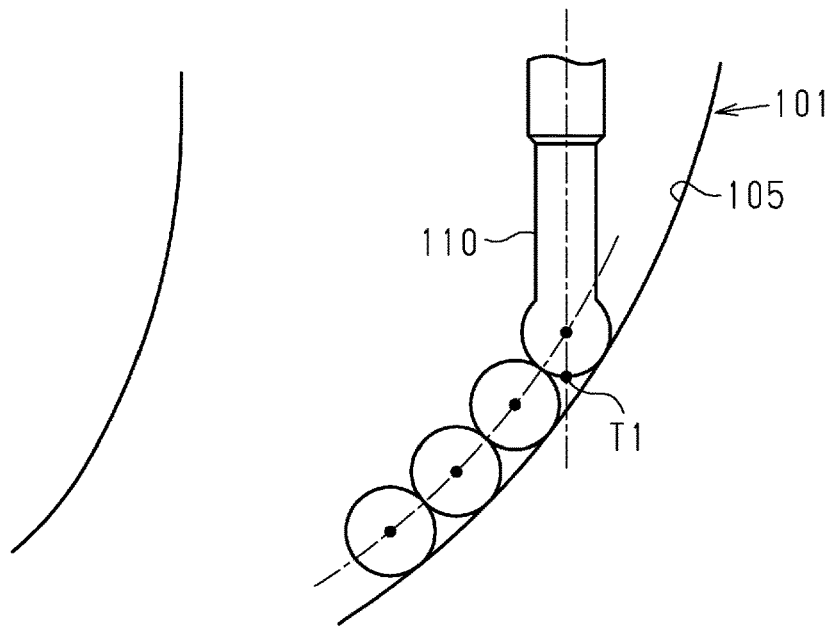
FIG. 9 is a diagram illustrating the procedure of the tool path calculation method in accordance with the present embodiment and how a tool orientation of a spherical tool is calculated to avoid interference.

First, shape data of the machined surface of the work 101 and shape data of the elliptic tool 10 are input (step S1). Next, the elliptic tool 10 is temporarily substituted with a spherical tool 110 (refer to FIG. 9). Further, the coordinates of the center of the spherical tool 110 are temporarily set to a position spaced apart from the machined surface 105 of the processed article by a certain distance. Subsequently, the path of the center point of the spherical tool 110 is calculated to avoid interference with the work 101 (step S2). Then, the position and orientation of the spherical tool 110 are calculated relative to the machined surface 105 of the work 101 (step S3). Next, the spherical tool 110 is substituted back to the elliptic tool 10. In this case, the orientation of the spherical tool 110 with respect to the work 101, in other words, the inclination angle of the tool axis 12 relative to the machined surface 105, is maintained (step S4). Also, a tip position T of the elliptic tool 10 when substituted back from the spherical tool 110 is matched with a tip position T1 of the spherical tool 110 (refer to FIG. 10).

Figure 10:
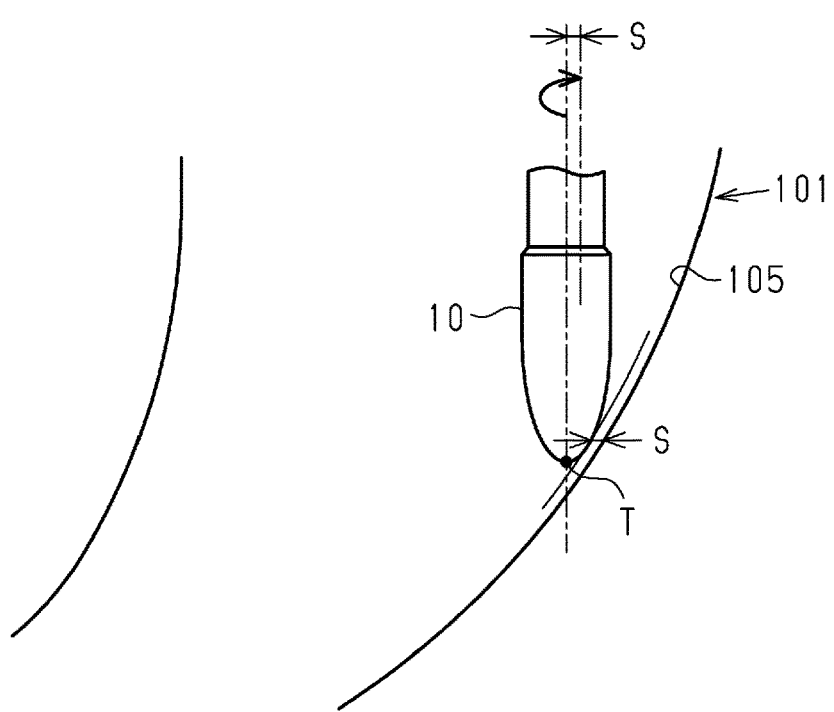
FIG. 10 is a diagram illustrating the procedure of the tool path calculation method and how the tool orientation is calculated when using an elliptic tool based on a calculation result of the tool orientation of the spherical tool.

Consequently, as shown in FIG. 10, a space S is formed between the elliptic tool 10 and the machined surface 105. Then, while maintaining the tool orientation, the elliptic tool 10 is shifted an amount corresponding to the gap (error) S to eliminate the space S so that the side surface of the elliptic tool 10 contacts the machined surface 105 (step S5).

As a result, the machining pitch P in the pick feed direction F is increased when the side surface where the curvature radius R is large becomes the cutting point. More specifically, the machining pitch P in the pick feed direction F is set to satisfy the inequality of $(P2/\sqrt{R2}) \geq (P1/\sqrt{R1})$.

In the inequality, "R1" refers to the curvature radius R of the elliptic tool 10 when a portion where the tool has a small curvature radius R is the cutting point. In the inequality, "P1" refers to the machining pitch P in the pick feed direction F of the elliptic tool 10 when a portion where the elliptic tool 10 has a small curvature radius R is the cutting point. In the inequality, "R2" refers to the curvature radius R of the elliptic tool 10 when a portion where the elliptic tool 10 has a large curvature radius R is the cutting point. In the inequality, "P2" refers to the machining pitch P in the pick feed direction F of the elliptic tool 10 when a portion where the elliptic tool 10 has a large curvature radius R is the cutting point.

Subsequently, the above steps are performed over an entire machining region of the machined surface 105 (step S6). Then, regions having an equal machining pitch P in the pick feed direction F are set (step S7). Next, the machining pitch P is set for each region and the tool path is calculated again by the procedure in step S2 to step S6. Then, interference of the elliptic tool 10 with the work 101 is checked as the final step. When there is interference, fine adjustment is performed to avoid interference (step S10).

Figure 11:
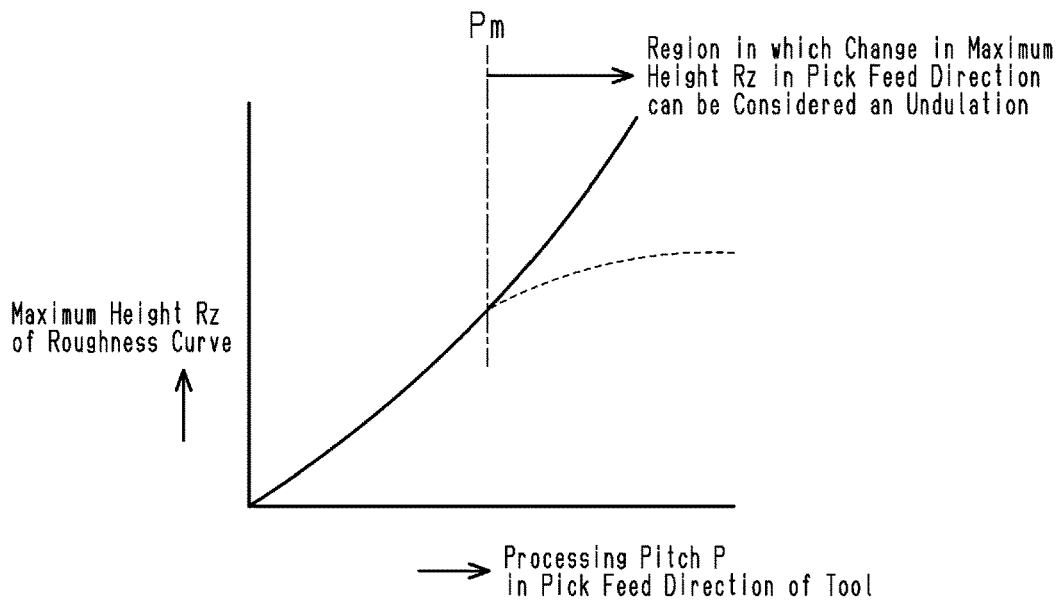
FIG. 11 a diagram illustrating the effect when machining the turbo compressor closed impeller based on the present tool path calculation method.

In this manner, as shown in FIG. 11, when the machining pitch P in the pick feed direction F is greater than or equal to a fixed value, cusps formed in the pick feed direction F by non-cut parts of the elliptic tool 10 can be considered to be an undulation. Accordingly, when the machining pitch P in the pick feed direction F is greater than or equal to a fixed value Pm, changes in maximum height Rz in the pick feed direction F do not have to be considered as surface roughness, and the surface roughness only relates to changes in the maximum height Rz resulting from the cusps formed in the feed direction Ff. This limits increases in the surface roughness.

When the machined surface 105 is machined along the tool path calculated as described above, tool machining marks are left in the machined surface 105 in a manner so that the concave grooves G are successively arranged in the pick feed direction F as shown in FIG. 7. In each concave groove G, fine concave grooves Gf are formed indicating the feed pitch Pf in the feed direction Ff of the elliptic tool 10.

A method for setting the machining pitch P in the pick feed direction F on the machined surface 105 in accordance with the method for manufacturing a processed article of the present disclosure will now be described with reference to FIGS. 12 to 14.

Figure 12:
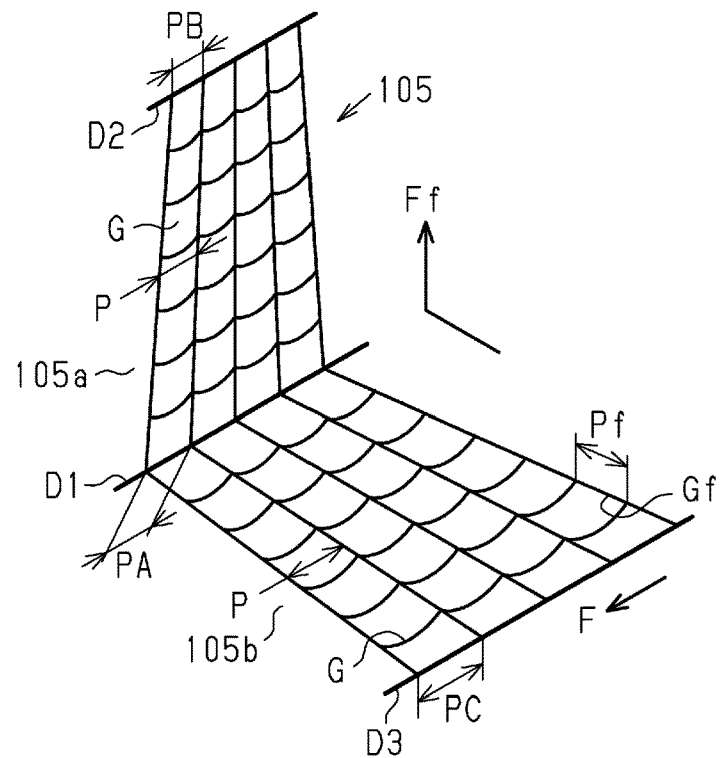
FIG. 12 is a diagram illustrating a method for setting a machining pitch in a pick feed direction when the machined surface includes multiple corners.

As shown in FIG. 12, in the present manufacturing method, when the machined surface 105 includes corners D1, D2, and D3 that connect two adjacent machined segment surfaces 105a and 105b, the machining pitch P in the pick feed direction F at the corners D1, D2, and D3 are set so that the machined segment surfaces 105a and 105b can successively be machined. This will now be described in detail using corner D1 as an example.

Figure 13A:
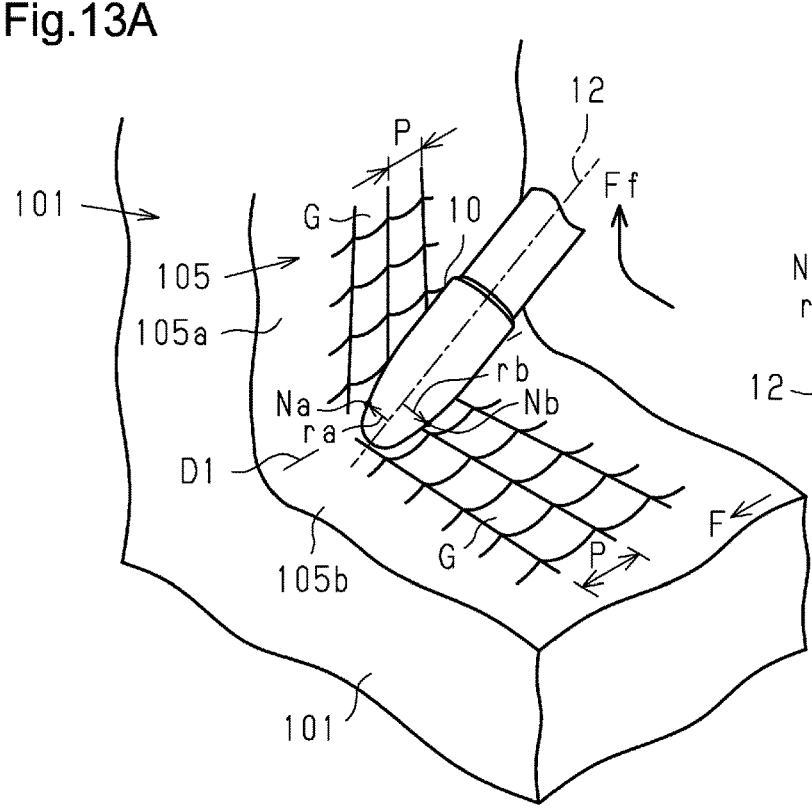

FIG. 13A shows a state in which the elliptic tool 10 is in contact with the two machined segment surfaces 105a and 105b at the corner D1. In this case, the tool orientation is adjusted so that the portion of the elliptic-formed tool 10 where the curvature radius R is maximal contacts the two machined segment surfaces 105a and 105b.

Figure 13B:
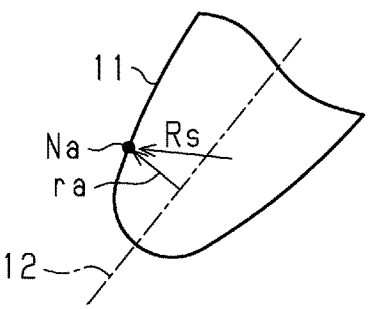

Next, as shown in FIGS. 13A and 13B, cross-sectional radii ra and rb after the adjustment are checked at contact points Na and Nb on the two machined segment surfaces 105a and 105b. Then, the curvature radius R of the tool at the contact point Na, which corresponds to the smaller one of the cross-section radii ra and rb, is set as a first curvature radius Rs. Subsequently, a machining pitch PA in the pick feed direction F in a case where the contact point Na corresponding to the first curvature radius Rs is the cutting point is determined as the machining pitch P at the corner D1. When machining is performed at the cutting point corresponding to the first curvature radius Rs, the machining pitch PA is calculated with the height of the cusps set to a predetermined value.

As shown in FIGS. 13A and 13B, the curvature radius R is larger at the cutting point where the machined segment surface 105b is machined than where the machined segment surface 105a is machined. Therefore, the machining pitch P in the pick feed direction F at the corner D1 can be set to the machining pitch PA by setting the cusp height to be smaller where the machined segment surface 105b is machined than where the machined segment surface 105a is machined.

In the machining method of the present disclosure, machining pitches PA, PB, and PC at the corners D1, D2, and D3 are set in this manner. When the machining pitches PA, PB, and PC at the corners D1, D2, and D3 are not the same, the machining pitch P on the machined segment surfaces 105a and 105b is set to change in proportion to the distance between the corners (D1, D2, D3) from the machining pitch of one corner to the machining pitch of the other corner. More specifically, with reference to FIG. 12, the machining pitch P on the machined segment surface 105a is set to change in proportion to the distance between the corner D1 and the corner D2 from the machining pitch PA at the corner D1 to the machining pitch PB at the corner D2 of the other end. In the same manner, the machining pitch P on the machined segment surface 105b is set to change in proportion to the distance between the corner D1 and the corner D3 from the machining pitch PA at the corner D1 to the machining pitch PC at the corner D3 of the other end. When the machining pitches PA, PB, and PC at the corners D1, D2, and D3 are the same, the machining pitch P does not have to be changed.

Figure 14A:
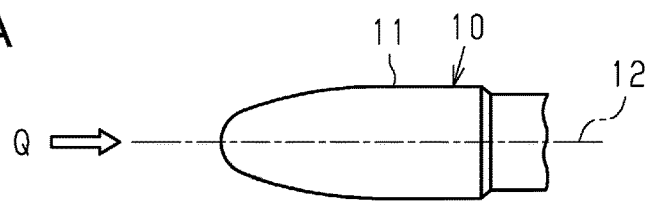
Figure 14B:
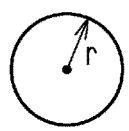
Figure 14C:
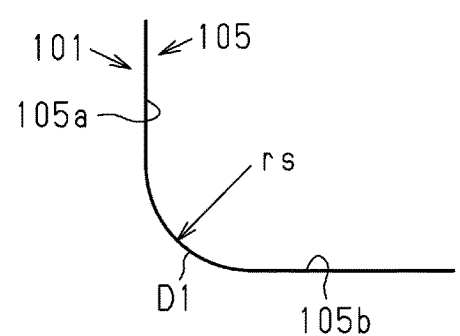
FIG. 14C is a cross-sectional view of the corner of the machined surface.

In order to perform such machining, it is preferred that the elliptic tool 10 have a size set as shown in FIGS. 14A and 14B. As shown in FIGS. 14A and 14B, when viewed from the distal end in the arrowed direction Q, the elliptic tool 10 has cross-sectional radius r at a maximal diameter portion of the cutting blade 11. Further, as shown in FIG. 14C, when a curved surface formed by machining the corner D1 has machined radius rs, it is preferred that the cross-sectional radius r of the elliptic tool 10 be less than or equal to the machined radius rs. More specifically, it is preferred that the cross-sectional radius r be smaller than or equal to or slightly larger than the machined radius rs.

Advantages

The above-described method for manufacturing a processed article has the following advantages.

(1) The machined segment surfaces 105a and 105b, which are adjacent to the corners D1, D2, and D3, can successively be machined while appropriately using the portion of the tool having a large curvature radius R. This reduces the machining time while maintaining the surface roughness of a machined surface at less than or equal to a set value. Here, a closed space refers to a space formed by three-dimensionally curved wall surfaces that are closed like a tube or a bag including at least one opening.

(2) Even for the processed article that includes the three-dimensionally curved machined surface 105 forming a closed space, the machined segment surfaces 105*a* and 105*b* adjacent to the corners D1, D2, and D3 can successively be machined.

(3) With the present method for manufacturing a processed article, the machining pitch P of the elliptic tool 10 in the pick feed direction F is increased when the portion of the elliptic tool 10 where the curvature radius R is large is the cutting point. Further, the machining pitch P of the elliptic tool 10 in the pick feed direction F is decreased when the portion of the elliptic tool 10 where the curvature radius R is small is the cutting point. In this manner, the portion of the elliptic tool 10 where the curvature radius R is large is used appropriately on the three-dimensionally curved machined surface 105 of a closed space. This reduces the machining time while maintaining the necessary surface roughness.

(4) With the present method for manufacturing a processed article, the machining pitch P in the pick feed direction F is set to satisfy the inequality of $(P2/\sqrt{R2}) \geq (P1/\sqrt{R1})$. Thus, when measuring the surface roughness of the three-dimensionally curved machined surface 105 of the work 101 that is machined, the machining pitch P can be increased to the range in which cusps formed in the pick feed direction F are considered to be an undulation. This limits increases in the maximum height and increases in the surface roughness.

(5) With the present method for manufacturing a processed article, the machining pitch P in the pick feed direction F is appropriately set when feeding the elliptic tool 10 over the corners D1, D2, and D3 to perform successive machining.

(6) With the present method for manufacturing a processed article, the machined surface 105 is machined while 5-axis control is performed on the orientation and position of the elliptic tool 10 relative to the machined surface 105. Thus, a complex three-dimensionally curved surface can be machined.

(7) With the method for calculating a tool path in the present method for manufacturing a processed article, the tool path is calculated in correspondence with the three-dimensional machined surface 105 to avoid interference with the work 101, and the curvature radius R of the elliptic tool 10 is calculated to maintain the calculated tool orientation at the cutting point. Further, the machining pitch P in the pick feed direction F is calculated based on the curvature radius R to satisfy a predetermined condition of the surface roughness. This reduces the machining time of the processed article while maintaining the set surface roughness reference value.

(8) The present processed article is manufactured by controlling the elliptic tool 10 in accordance with the tool path calculation method. This reduces the machining time of the processed article and decreases the manufacturing costs of the processed article.

(9) With the present impeller, the tool machining marks are formed on the machined surface 105. In the tool machining marks, the concave grooves G of the machining pitch P are formed in the pick feed direction F of the elliptic tool 10 so that the machining pitch P of adjacent concave grooves G increases as the curvature radius of the concave groove G becomes greater. In this manner, the manufacturing method can be applied to reduce the machining time while maintaining the set surface roughness reference value.

(10) The turbo compressor closed impeller 1 reduces the machining time of the turbo compressor closed impeller 1 while maintaining the set surface roughness reference value.

MODIFIED EXAMPLES

The description related with the above embodiment exemplifies, without any intention to limit, an applicable form of a method for manufacturing a processed article, a method for calculating a tool path, a processed article, and an impeller. In addition to the above-described embodiment, the method for manufacturing a processed article, the method for calculating a tool path, the processed article, and the impeller are applicable to, for example, modified examples of the above embodiment that are described below and combinations of at least two of the modified examples that do not contradict each other.

In the above embodiment, the tool having an elliptic projected shape at a side parallel to the tool axis 12 is an example of the tool. Alternatively, a tool may have a side of which the projected shape is barrel-like and formed by arcs having different curvature radii.

The manufacturing method is exemplified to end milling using a tool having the elliptic projected shape at a side parallel to the tool axis 12. Alternatively, the manufacturing method may be applied to polishing that uses a grinding stone, a brush, or the like of which the projected shape of a side is elliptic.

In the above embodiment, the turbo compressor closed impeller 1 is an example of the closed space. However, the closed space may be a space formed by three-dimensionally curved wall surfaces that are closed like a bag including at least one opening.

The manufacturing method of the present disclosure can be applied to the processed article including an open machined surface.

As an example of 5-axis machining in the above embodiment, five axes are described to include two axes, namely, the pivot axis 103 and the rotation axis 104, at the side of the table 102 in addition to the three orthogonal axes along which the elliptic tool 10 is moved. Instead, 5-axis machining may be performed with one of the two rotation axes provided for the table 102 and the other one of the two rotation axes provided for the elliptic tool 10. Further, the two axes may be at the side of the elliptic tool 10.

It should be understood that the above-described disclosure may be embodied in many other specific forms within the scope and equivalence of the present disclosure described in the appended claims.

What is claimed is:

1. A method for manufacturing a processed article with a tool, the tool including a cutting blade, the cutting blade having a cross-sectional surface along a tool axis of the cutting blade, an outer periphery of the cross-sectional surface being formed from arcs having different curvature radii comprising at least a first curvature radius and a second curvature radius, to machine a machined surface that includes at least one inner corner at which two adjacent machined segment surfaces meet, the method comprising:

arranging the cutting blade to be in contact with the two machined segment surfaces simultaneously, so that two contact points are defined between the two machined segment surfaces and the cutting blade in the at least one inner corner, one of the two contact points being at the first curvature radius and another one of the two contact points being at the second curvature radius, the first curvature radius being smaller than the second curvature radius; and setting a machining pitch in a pick feed direction of the tool at the at least one inner corner to a first machining pitch for when a part of the cutting blade corresponding to the shape of the side surface of the cutting blade having the first curvature radius is a cutting point, and performing a cut along a feed direction in the two adjacent machined segment surfaces successively at the at least one inner corner so that the tool proceeds toward the at least one inner corner in one of the machined segment surfaces and away from the at least one inner corner in the other one of the machined segment surfaces, the pick feed direction being perpendicular to the feed direction of the tool.

2. The method for manufacturing a processed article according to claim 1, wherein
the tool is formed so that a cross-sectional radius of a maximal diameter portion of the cutting blade as viewed from a tip in a tool axis is less than or equal to a machined radius that is formed when machining the at least one inner corner.

3. The method for manufacturing a processed article according to claim 1, wherein
the processed article includes the machined surface having a three-dimensional curve forming a closed space, and
the machined segment surfaces form part of the machined surface.

4. The method for manufacturing a processed article according to claim 1, wherein
the curvature radius that forms the shape of the side surface of the cutting blade at the other one of the two contact points having a cross-sectional radius that is larger than a cross sectional radius at the contact point having the first curvature radius is a second curvature radius,
when the cutting point is set at a portion of the tool where the arc that forms the side surface is defined by the first curvature radius, the curvature radius of the tool is denoted by R1, and the machining pitch in the pick feed direction of the tool is denoted by P1,
when the cutting point is set at a portion of the tool where the arc that forms the side surface is defined by the second curvature radius, the curvature radius of the tool is denoted by R2, and the machining pitch in the pick feed direction of the tool is denoted by P2, and
the machining pitch P1 and the machining pitch P2 in the pick feed direction are set to satisfy an inequality of $(P2/\sqrt{R2}) \geq (P1/\sqrt{R1})$.

5. The method for manufacturing a processed article according to claim 1, wherein
the machined surface includes a plurality of inner corners connecting the two adjacent machined segment surfaces, and
when the first machining pitch at one inner corner of the plurality of inner corners at one end of the machined segment surface differs from a second machining pitch at another one inner corner of the plurality of inner corners of another end, the machining pitch in the pick feed direction on the machined segment surfaces is set to change in proportion to a distance between the plurality of inner corners on the machined segment surfaces.

6. The method for manufacturing a processed article according to claim 1, wherein the machined surface is machined while 5-axis controlling an orientation and a position of the tool relative to the machined surface by a 5-axis control machining center.

7. The method for manufacturing a processed article according to claim 1, wherein
the tool is attached to an articulated robot to control an orientation and a position of the tool relative to the machined surface.

8. A method for calculating a tool path in the method for manufacturing a processed article according to claim 1, the tool path calculation method comprising:
calculating an orientation of the tool in correspondence with the machined surface to avoid interference with a work,
calculating the curvature radius of the tool to maintain the calculated tool orientation at a cutting point, and
calculating the machining pitch in the pick feed direction based on the curvature radius to satisfy a predetermined surface roughness condition.

9. A processed article manufactured by controlling the tool in accordance with the method for calculating a tool path according to claim 8.

10. The method for manufacturing a processed article according to claim 2, wherein
the processed article includes the machined surface having a three-dimensional curve forming a closed space, and
the machined segment surfaces form part of the machined surface.

11. The method for manufacturing a processed article according to claim 2, wherein
the curvature radius that forms the shape of the side surface of the cutting blade at the other one of the two contact points having a cross-sectional radius that is larger than a cross sectional radius at the contact point having the first curvature radius is a second curvature radius,
when the cutting point is set at a portion of the tool where the arc that forms the side surface is defined by the first curvature radius, the curvature radius of the tool is denoted by R1, and the machining pitch in the pick feed direction of the tool is denoted by P1,
when the cutting point is set at a portion of the tool where the arc that forms the side surface is defined by the second curvature radius, the curvature radius of the tool is denoted by R2, and the machining pitch in the pick feed direction of the tool is denoted by P2, and
the machining pitch P1 and the machining pitch P2 in the pick feed direction are set to satisfy an inequality of $(P2/\sqrt{R2}) \geq (P1/\sqrt{R1})$.

12. The method for manufacturing a processed article according to claim 2, wherein
the machined surface includes a plurality of inner corners connecting the two adjacent machined segment surfaces, and
when the first machining pitch at one inner corner of the plurality of inner corners at one end of the machined segment surface differs from a second machining pitch at another one inner corner of the plurality of inner corners of another end, the machining pitch in the pick feed direction on the machined segment surfaces is set to change in proportion to a distance between the plurality of inner corners on the machined segment surfaces.

13. The method for manufacturing a processed article according to claim 2, wherein the machined surface is machined while 5-axis controlling an orientation and a position of the tool relative to the machined surface by a 5-axis control machining center.

14. The method for manufacturing a processed article according to claim 3, wherein
the curvature radius that forms the shape of the side surface of the cutting blade at the other one of the two contact points having a cross-sectional radius that is larger than a cross sectional radius at the contact point having the first curvature radius is a second curvature radius,
when the cutting point is set at a portion of the tool where the arc that forms the side surface is defined by the first curvature radius, the curvature radius of the tool is denoted by R1, and the machining pitch in the pick feed direction of the tool is denoted by P1,
when the cutting point is set at a portion of the tool where the arc that forms the side surface is defined by the second curvature radius, the curvature radius of the tool is denoted by R2, and the machining pitch in the pick feed direction of the tool is denoted by P2, and
the machining pitch P1 and the machining pitch P2 in the pick feed direction are set to satisfy an inequality of $(P2/\sqrt{R2}) \geq (P1/\sqrt{R1})$.

15. The method for manufacturing a processed article according to claim 3, wherein
the machined surface includes a plurality of corners connecting the two adjacent machined segment surfaces, and
when the first machining pitch at the corner at one end of the machined segment surface differs from a second machining pitch at the corner of another end, the machining pitch in the pick feed direction on the machined segment surfaces is set to change in proportion to a distance between the plurality of corners on the machined segment surfaces.

16. The method for manufacturing a processed article according to claim 3, wherein
the machined surface is machined while 5-axis controlling an orientation and a position of the tool relative to the machined surface by a 5-axis control machining center.

17. The method for manufacturing a processed article according to claim 4, wherein
the machined surface includes a plurality of inner corners connecting the two adjacent machined segment surfaces, and
when the first machining pitch at one inner corner of the plurality of inner corners at one end of the machined segment surface differs from a second machining pitch at another one inner corner of the plurality of inner corners of another end, the machining pitch in the pick feed direction on the machined segment surfaces is set to change in proportion to a distance between the plurality of inner corners on the machined segment surfaces.

18. The method for manufacturing a processed article according to claim 4, wherein
the machined surface is machined while 5-axis controlling an orientation and a position of the tool relative to the machined surface by a 5-axis control machining center.

19. The method for manufacturing a processed article according to claim 5, wherein
the machined surface is machined while 5-axis controlling an orientation and a position of the tool relative to the machined surface by a 5-axis control machining center.

20. The method for manufacturing a processed article according to claim 6, wherein
the tool is attached to an articulated robot to control an orientation and a position of the tool relative to the machined surface.

\* \* \* \* \*